Dec. 30, 1924.
O. G. HARRIS
GRINDING MACHINE
Filed Dec. 12, 1922
1,520,817
2 Sheets-Sheet 2
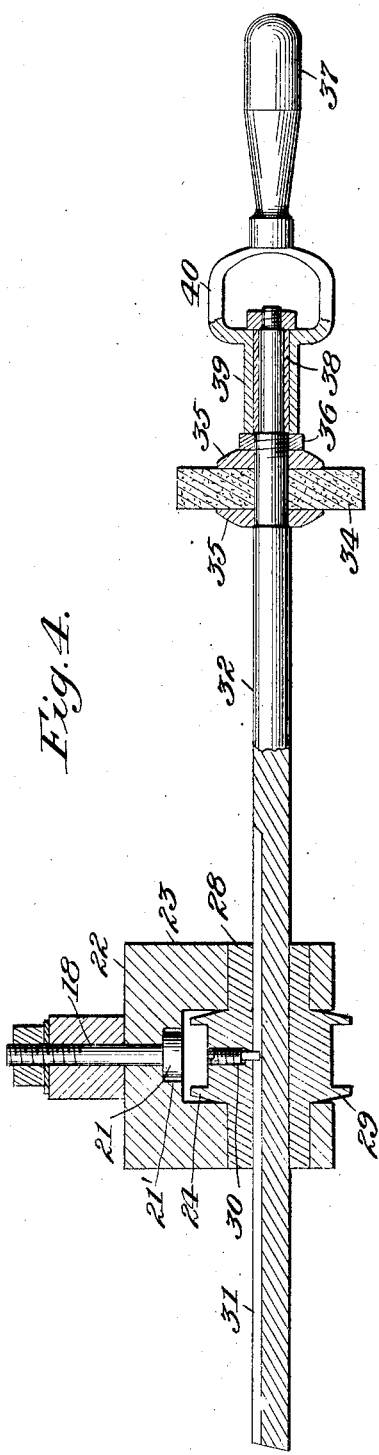
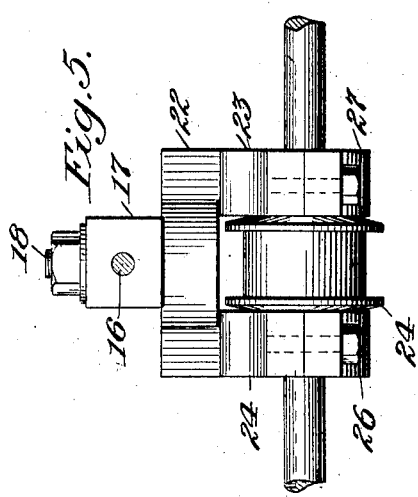
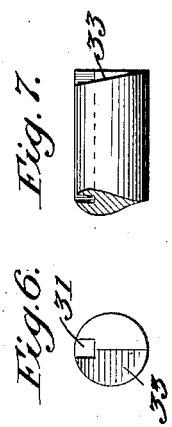
Inventor:
Ora Glenn Harris
By Cushman Bryant Darby
Att'ys.

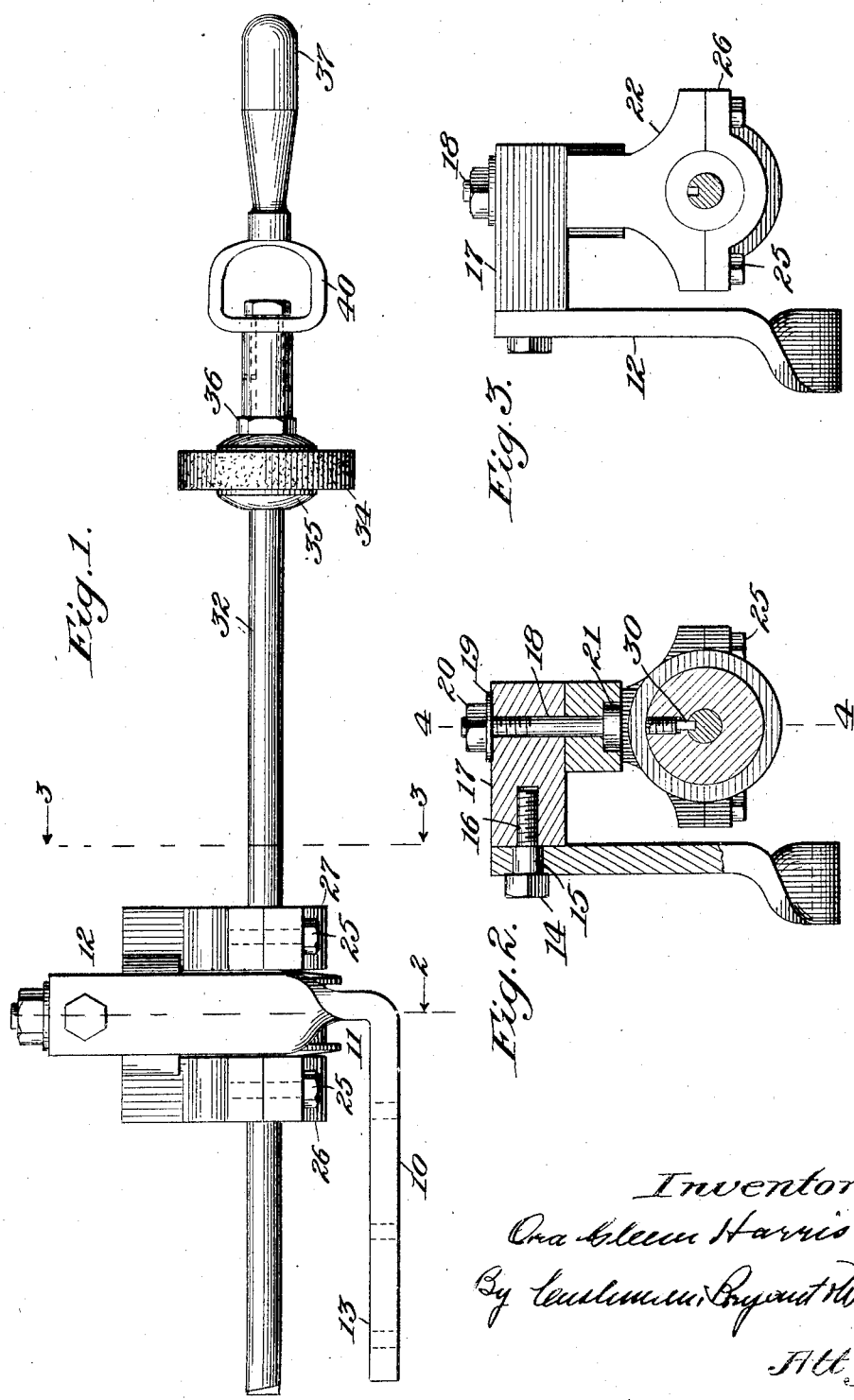

Patented Dec. 30, 1924.

1,520,817

UNITED STATES PATENT OFFICE.

ORA G. HARRIS, OF LAUREL, MISSISSIPPI.

GRINDING MACHINE.

Application filed December 12, 1922. Serial No. 606,435.

*To all whom it may concern:*

Be it known that I, ORA G. HARRIS, a citizen of the United States, residing at Laurel, in the county of Jones and State of Mississippi, have invented new and useful Improvements in Grinding Machines, of which the following is a specification.

The present invention relates to improvements in grinding, smoothing or polishing apparatus, and is designed to provide a simple effective mounting and drive for an emery wheel or other suitable abrading device which will permit the wheel to be moved to various positions, and grind or polish surfaces lying in different planes and angles without shifting the position of the article. Furthermore, there is provided connection whereby the shaft may be quickly and readily engaged or disengaged from the pulley while the latter is in motion.

In order that the invention may be clear to those skilled in the art, I have set forth in the following detailed description, which is to be considered in connection with the accompanying drawings, the structural features and advantages of my device.

In said drawings:—

Figure 1 is a horizontal view of the device;

Figure 2 is a cross section taken on the line 2—2 of Figure 1;

Figure 3 is an elevational view taken on the line 3—3 of Figure 1;

Figure 4 is a horizontal view partly in section;

Figure 5 is a detail view of the device; and

Figures 6 and 7 are end and side views respectively, of one end of the shaft member.

Referring to the drawings by numerals, like numerals indicating like parts in the several views, the supporting member comprises a horizontal arm 10, which may be attached to any suitable bench or support, said arm 10 being twisted at 11 and thrown at right angles to form a vertical arm 12. The arm 10 is secured to the bench by means of the apertures 13, through which suitable bolts may be passed. A horizontal block 17 is pivotally secured to the arm 12 by the threaded bolt 14 which has between its ends a smooth portion 15, thus permitting a pivotal movement of the block 17 with respect to the arm 12. A yoke 22 is pivotally secured to the block 17 by means of the threaded bolt 18, which has an enlarged head 21 swiveled in the recess 21' of the yoke. The bolt 18 is secured to the block 17 by means of the nut 20 and the washer 19. The depending arms 23 and 24 of the yoke have secured thereto, by bolts 25, the bearing heads 26 and 27 respectively. Said arms and heads forming a bearing for the axle 28 to which is secured the drive pulley 29, which pulley 29 has a radial pin 30 extending into the bore of the axle 28. The pin 30 fits in a key-way 31 formed on the shaft 32, said key-way extending from any desired point on said shaft to one end thereof. The shaft 32, has at one end, diametrically opposite the key-way, a spiral cut-away portion 33, as best shown in Figures 6 and 7, said portion being so formed as to permit the pin 30 to ride into engagement or be disengaged from the key-way 31 on the shaft when the pulley is in motion.

This operation thus allows the emery wheel on the shaft to be removed and another substituted in its place while the pulley is in motion without throwing off the power or stopping the pulley. The shaft 32 has a reduced portion to which an abrading wheel 34 is rigidly secured by means of the collars 35 and the lock nut 36. One end of the shaft is swiveled to a handle 37 by means of a bushing 38, which is secured to a sleeve portion 39 on said handle. Said sleeve portion being split at one end to form side arm members 40 which converge at the handle. This specific construction of the handle permits access to the locking nut 41 which secures the sleeve portion and bushing member of the handle to the shaft.

It is to be understood that the form of invention herewith shown and described is to be taken as a preferred embodiment of the same, and that such minor changes in construction and arrangement of parts may be made as will remain within the spirit of the invention and the scope of which is claimed.

Having thus described the invention what is claimed as new is:

1. In a device of the class described, the combination of a suitable support, a driving pulley mounted for universal movement on said support, a shaft coupled to said pulley for rotation but shiftable longitudinal relative thereto, means for connecting said shaft to said pulley when the latter is rotating, and a grinding element on said shaft.

2. In a device of the class described, the combination of a suitable support, a driving pulley having a shaft-receiving bore mounted on said support for universal movement, a shaft freely movable longitudinally in the bore of said pulley, means on said pulley for imparting movement of rotation to said shaft, means for connecting said shaft to said pulley when the latter is rotating, and a grinding element on said shaft.

3. In a device of the class described, the combination of a suitable support, a driving pulley having a central bore mounted for universal movement on said support, a longitudinally-slotted shaft freely movable longitudinally in the bore of said pulley, a slot engaging projection on said pulley to drive said shaft, means for connecting said shaft to said pulley when the latter is rotating, and a grinding element on said shaft.

4. In a device of the class described, the combination of a suitable support, a pulley having a central bore mounted for universal movement on said support, a longitudinally-slotted shaft movable longitudinally in the bore of said pulley, a slot engaging projection on said pulley to couple said shaft to automatically engage said projection with the shaft slot when the shaft is rotating, and a grinding element on said shaft.

5. In a device of the class described, the combination of a suitable support, a block pivotally mounted on said support, a yoke pivotally mounted on said block at right angles to the pivot connection between said block and support to provide a universal movement, a driving pulley having a central bore mounted in said yoke, a longitudinally-slotted shaft movable longitudinally in the central bore of said pulley, a radially disposed slot-engaging pin in the bore of said pulley, means at the end of said shaft to automatically engage said pin with said slot, a grinding element on said shaft, and a swivelled handle adjacent said grinding wheel for manual manipulation.

6. The combination of a rotary drive member, a removable and longitudinally shiftable shaft coupled to said drive member for rotation, and means automatically to engage said shaft rotatably with said member while said member is rotating.

7. The combination of a rotary drive member, a removable and longitudinally shiftable shaft coupled to said drive member for rotation, and means on said shaft automatically to engage it rotatively with said drive member while said member is rotating.

8. The combination of a rotary drive member having a shaft receiving bore, a longitudinally slotted shaft removable from and longitudinally shiftable in said bore, means on said drive member to engage the slot in said shaft for rotation, and means to direct said shaft engaging means to said slot and automatically couple said drive member and shaft while said drive member is rotating.

9. The combination of a rotary drive member having a shaft receiving bore, a longitudinally slotted shaft removable from and longitudinally shiftable in said bore, a radial projection on said drive member to engage the slot in said shaft for rotation, and means on said shaft to guide said projection to said slot and automatically couple said member and shaft for rotation while said drive member is rotating.

10. The combination of a rotary drive member having a shaft receiving bore, a longitudinally slotted shaft removable from and longitudinally shiftable in the bore of said drive member, a radially disposed pin in said bore to engage the slot in said shaft for rotation, a curved surface at the end of the shaft automatically to guide said pin into the shaft slot and couple said drive member and shaft while said drive member is rotating.

11. The combination of a rotary drive member having a shaft receiving bore, a longitudinally slotted shaft removable from and longitudinally shiftable in the bore of said drive member, a radially disposed pin in said bore to engage the slot in said shaft for rotation, a spiral face at the end of said shaft automatically to guide said pin into the shaft slot and couple said drive member and shaft while said drive member is rotating.

In testimony whereof I have hereunto set my hand.

ORA G. HARRIS.